United States Patent Office 2,956,391
Patented Oct. 18, 1960

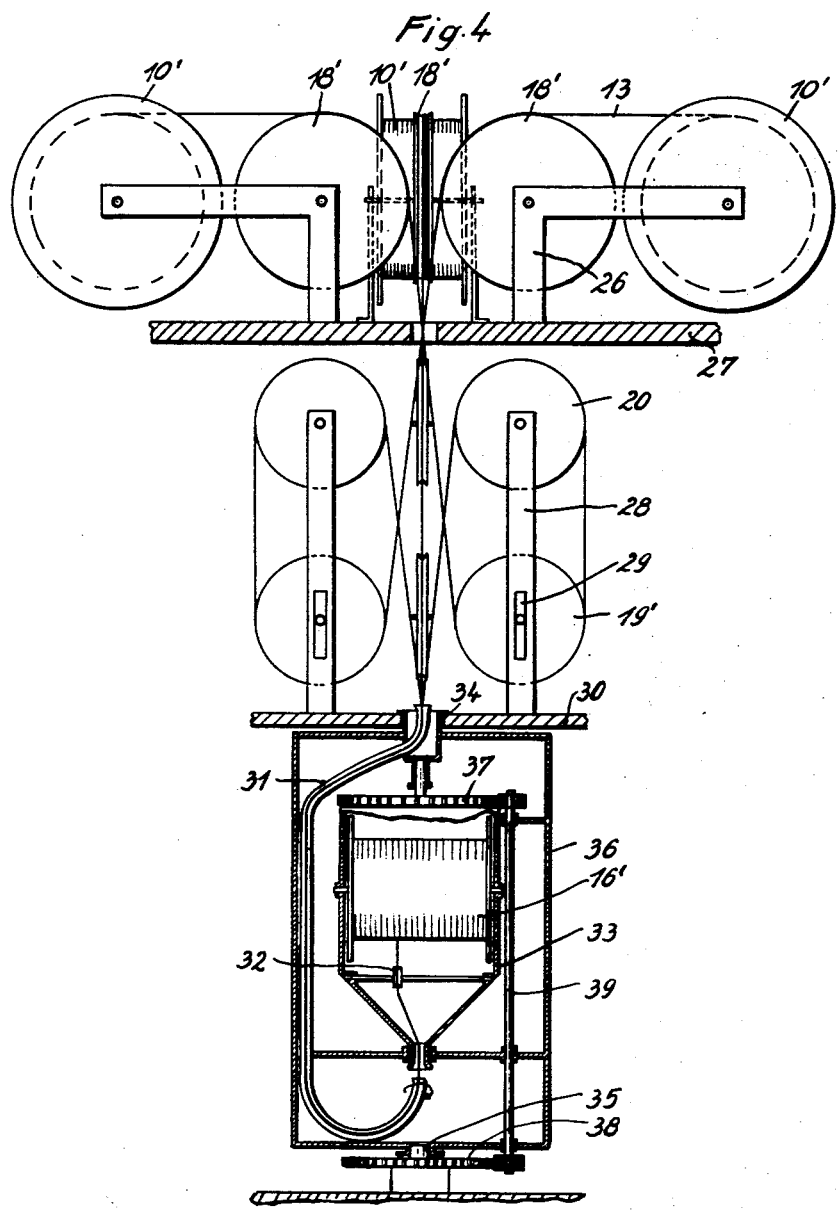

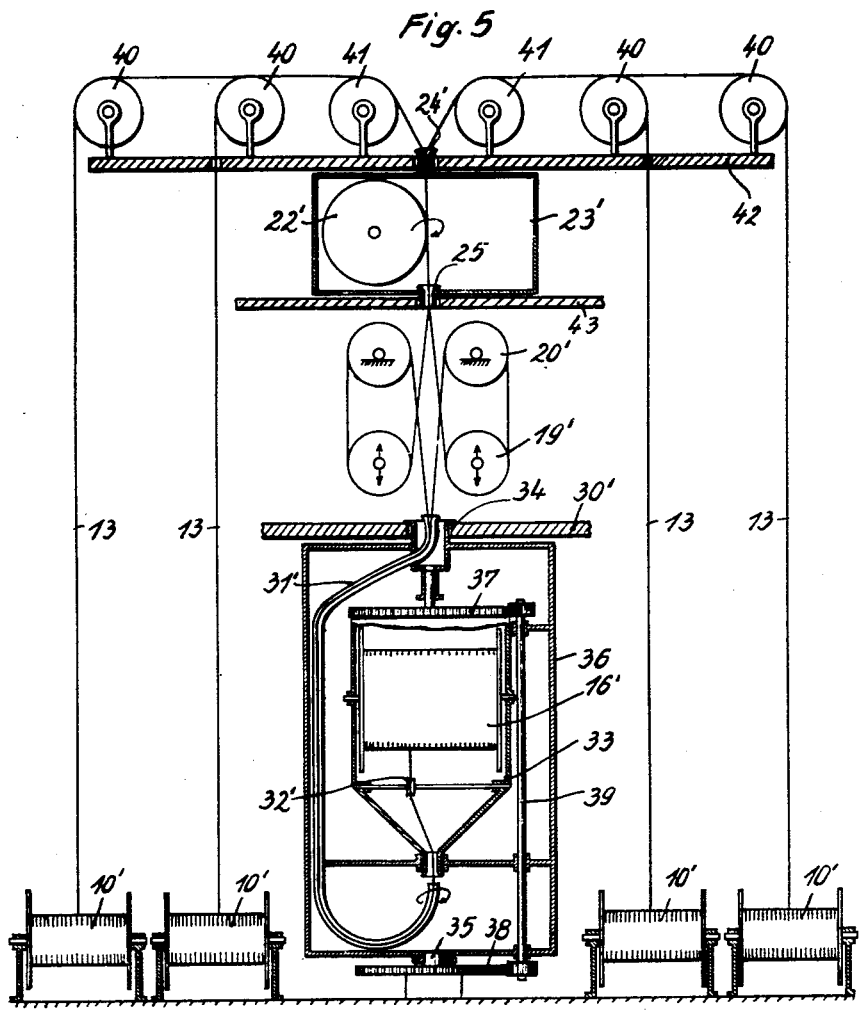

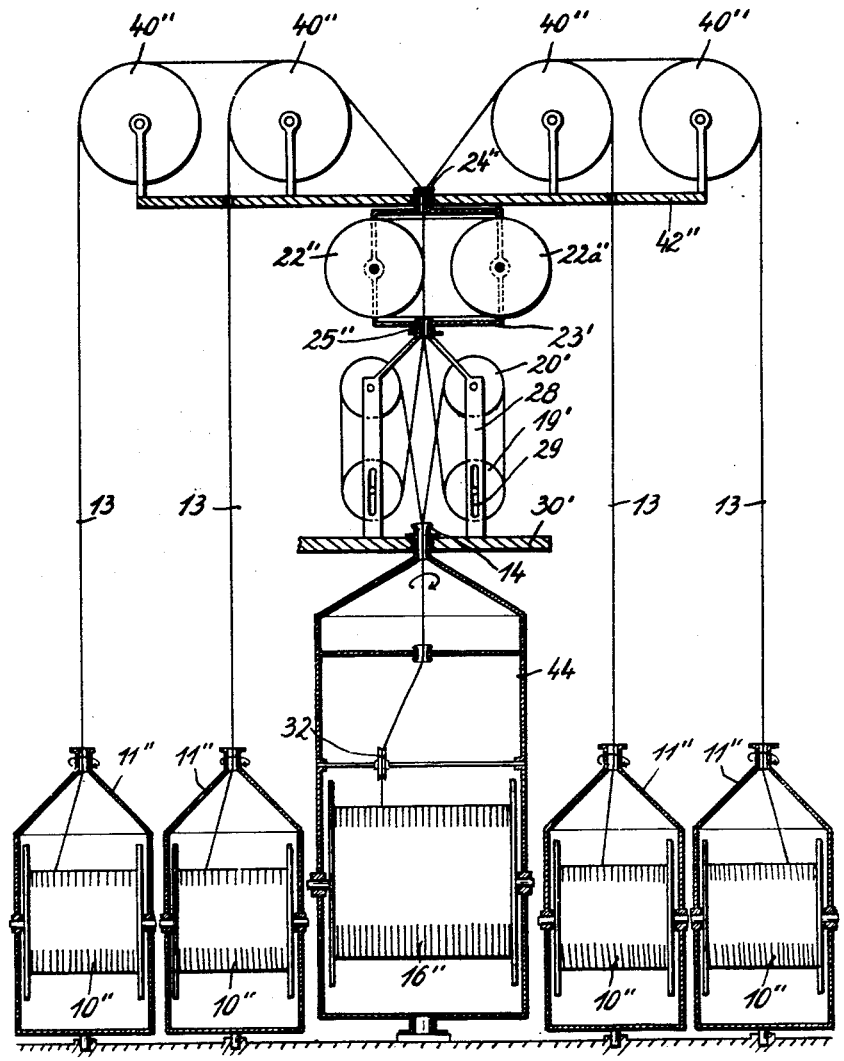

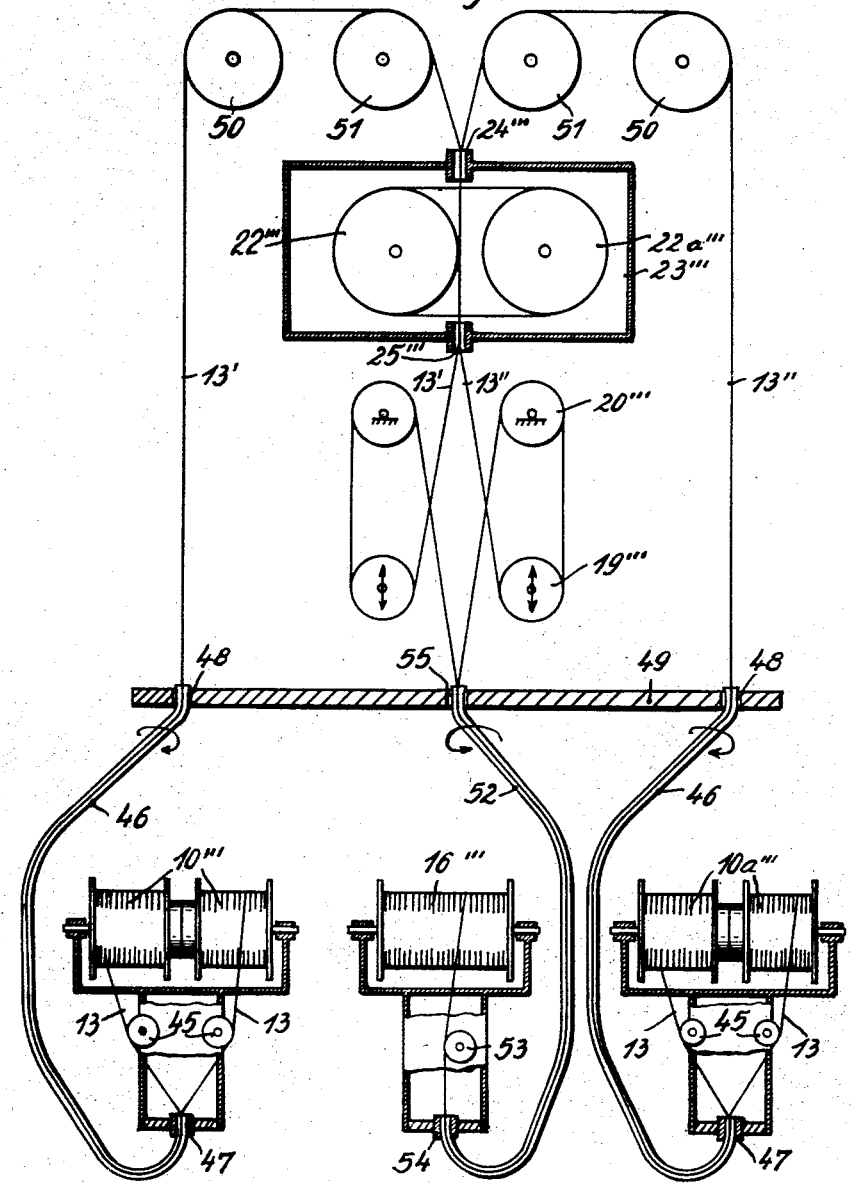

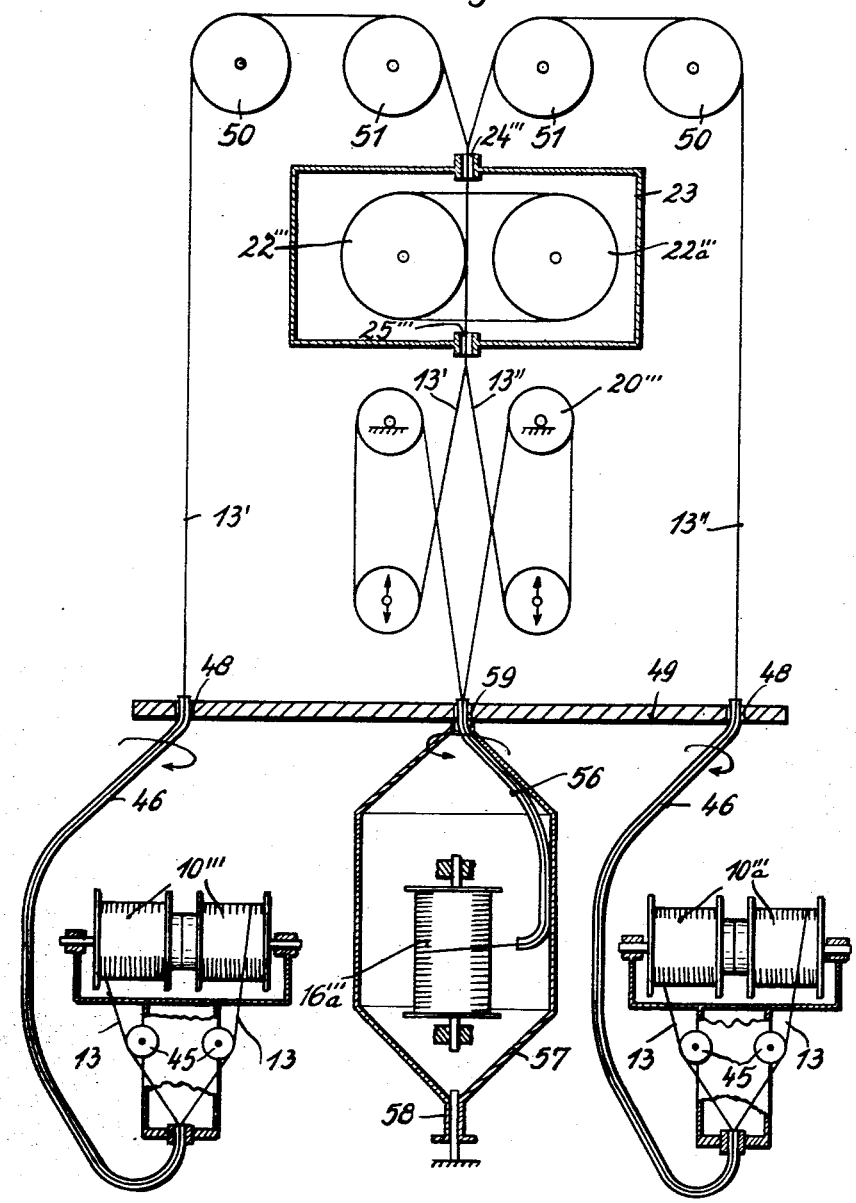

2,956,391

CABLE-FORMING APPARATUS

Georg Demmel and Wilhelm Wirth, Berlin-Siemensstadt, Germany, assignors to Siemens-Schuckertwerke Aktiengesellschaft, Berlin, Germany, a joint-stock company of Germany Filed Sept. 26, 1956, Ser. No. 612,160

Claims priority, application Germany Sept. 30, 1955

17 Claims. (Cl. 57—60)

Figure 1:
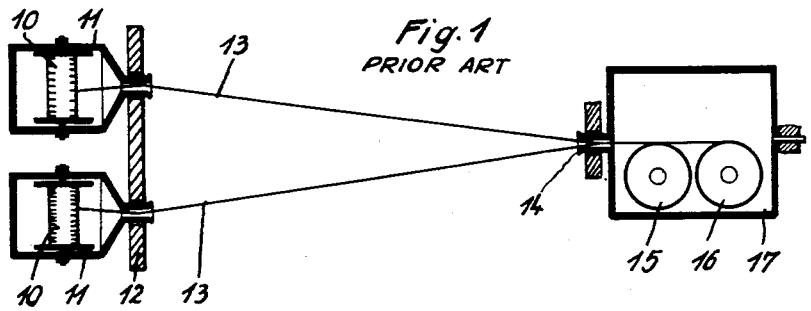

Our invention relates to the manufacture of electric communication cables by roping machines and is described herein with reference to the drawings in which Fig. 1 shows diagrammatically a cable forming machine according to prior art, for the purpose of explanation and comparison; and Figs. 2 to 8 illustrate, schematically and partly in section, seven different examples of machines embodying the invention.

More specifically, our invention relates to apparatus for producing twisted cable elements consisting of a plurality of wires or strands, such as radial phantom cable elements, or twisted groups of such cable elements, such as DM-phantom elements, for tele-communication purposes.

Prior to the present invention such twisted communication-cable components were generally manufactured by means of cable-forming apparatus in which the supply drums for the wires or elements to be twisted are mounted in rotating baskets. The high momentum of such baskets severely limits the speed of roping operation in such apparatus so that the output is low. The fabricating speed may be increased by using the so-called high speed cable-forming machines in which the supply drums coordinated to a cable element are disposed parallel to the twisting axis or one behind the other in the direction of the machine axis. However, in roping-basket machines as well as in the known high speed twisting machines it is difficult to attain a sufficiently small coupling value between the cable elements or groups of elements, particularly since the coupling requirements for tele-communication cables have become more exacting owing to the extension of carrier-frequency transmission to larger frequency ranges.

There are also known cable-forming machines in which the strands are pulled off from drums mounted for rotation about axes which are stationary in space, the twisting of the strands being effected by rotating the pulling-off sheave together with the wind-up drum that receives the twisted product.

Such a machine of the horizontal type is illustrated in Fig. 1 of the accompanying drawings in diagrammatic manner. In this machine the supply drums 10 for the wires or strands are rotatably mounted in stationary frames or yokes 11. When the cable-forming machine serves to produce a phantom cable element or star quad, four such yoke-supported supply drums are provided. For the sake of simplicity two of such drums only are shown in the drawings. The yokes are supported by a plate 12 with openings for the passage of the strands 13 pulled off the drums. The wires run through a twisting nipple 14 and thence around the pulling-off sheave 15 to the winding-up drum 16. The sheave 15 and the drum 16 are mounted in the rotating frame 17. The twisting of the strands in nipple 14 is effected by rotation of frame 17. While higher twisting speeds may be attained with such apparatus, it is still difficult to obtain uniform twisting of the four strands. Because of the different weights of the supply drums and because of different friction losses in the bearings and for other reasons, the strands 13 have a fluctuating tension as they are running off the drums 10, and such fluctuations result in non-uniform twisting of the strands in the nipple.

It is the object of our invention to remedy this deficiency and to provide a cable-making machine in which utmost uniformity of the twisting operation is ensured. For this purpose, we have modified the manufacture just described with reference to Fig. 1 in two material respects. First, the strand-pulling means act on the strands before the same pass through the twisting nipple and, secondly, we insert a stationary equalizing or symmetrizing mechanism for rendering the strands symmetrical with respect to their tension and length between the cable-pulling means and the twisting point. Hence, our novel method of producing twisted multiple-wire cable elements and twisted groups of such elements for tele-communication cables, resides in that the individual strands or cable elements are fed from stationary drums or drum yokes, individually around separate pulling sheaves or around a common pulling sheave, to a stationarily mounted mechanism which receives a symmetrical run of the strands and provides for equal lengths of the strands and for regulation of the strand pulling forces, the strands being fed from that mechanism to the twisting point where the strands or cable elements are formed into the twisted cable component.

Figure 2:
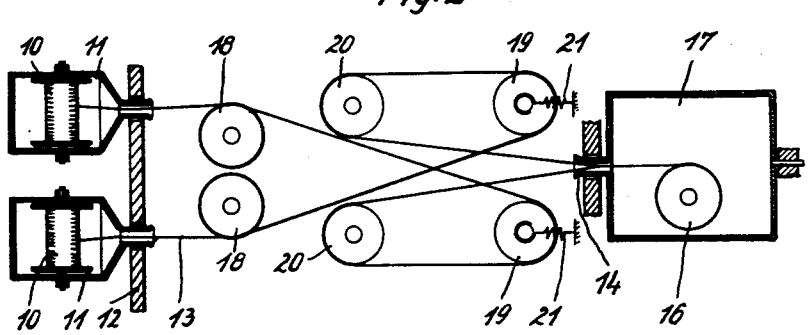
Figure 3:
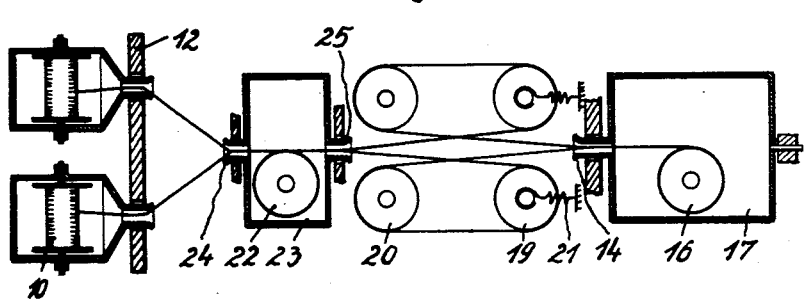

Our invention will now be more fully described with reference to Fig. 2 so that the novel features will readily appear from a comparison with the prior art described with reference to Fig. 1. In Fig. 2 the same reference numerals 10, 11, 12 and 13 as in Fig. 1 are applied to the supply drums, the yokes carrying the same, the supporting plate for the yokes, and the strands. In contradistinction to Fig. 1 the strands are running around separate pulling sheaves 18 and thence into a mechanism for rendering the strands symmetrical, such mechanism comprising guiding rollers 19 mounted for movement in a direction parallel to the twisting axis, and stationary guide rollers 20. Within this mechanism the individual strands pass first around the movable rollers 19 and then around the stationary rollers 20 and thence through the twisting nipple 14 to the winding-up drum or cable take-up means 16 which is mounted within the rotating frame 17. The tensions set up in the strands may be kept equal by the diagrammatically indicated adjustable springs 21. By the provision of the pulling-off sheaves 18 in front of the twisting nipple and by the insertion of the mechanism rendering the strands symmetrical, differences of the pulling tensions introduced by the strand supply drums are eliminated. Hence, the invention affords higher twisting speeds and receives smaller coupling values. Moreover, the apparatus according to our invention permits eliminating the pulling-off sheave 15 from the frame 17 of the known twisting apparatus (Fig. 1) to thereby permit a higher speed of rotation of the frame 17 (Fig. 2). A still higher twisting speed may be attained according to the present invention by a stationary disposition of the winding-up drum, the strands being guided by bails or rollers rotating about the winding drum.

A common pulling-off sheave may be substituted for the separate pulling sheaves 18. This may serve, according to another feature of the invention, to effect a pre-twisting and re-twisting prior to the final twisting of the strands. To this end, we provide for rotation of the common pulling sheave about the twisting axis as is apparent from Fig. 3 in which the common twisting sheave is designated by 22. The strands running around the pulling sheave 22 are provisionally twisted in a twisting nipple 24 by rotation of the frame 23 in which the pulling sheave is mounted, the strands being retwisted in an exit nipple 25. Such a provisional twisting and re-twisting of the strands eliminates irregular dynamic influences exerted by the strand supply drums 10 upon the twisting operation proper occurring in the twisting station 14 so that a uniform constant tension of the strands prevails in all four strands over the entire length of the cable element.

In the manufacture of twisted groups of cable elements, each group comprising a plurality of twisted cable elements, particularly for phantom cables, it is known to first twist the cable element to form a provisional group whereupon the provisional group is re-twisted in an additional mechanism rotating in a direction contrary to the twist of the provisional group, and to subsequently twist the elements to constitute the final twisted group. In contrast thereto, the pre-twisting and the re-twisting according to the present invention is effected by rotation of the common pulling-off sheave, i.e. in a single mechanism.

While our invention is described above with reference to cable roping machines of the horizontal type, we have found that our invention is preferably applicable to machines of the vertical type in which the reversal of the running direction of the individual strands is effected by means of the pulling-off sheaves or by separate idler sheaves. In machines of the vertical type, the symmetrizing mechanism according to the invention is of a particularly simple design and is, therefore, applicable with great advantage.

Such a cable-forming apparatus of the vertical type for producing a star-quad cable element is illustrated in Fig. 4. The strands are individually pulled off the supply drums by means of separate pulling sheaves. Each supply drum 10' and the associated pulling sheave 18' are rotatably mounted on a common bracket 26 of angular shape. The four brackets 26 are mounted on a supporting plate 27 in star arrangement. The symmetrizing mechanism is located beneath the supporting plate 27 and comprises four movable rollers 19' and four stationary rollers 20. Each stationary roller 20 is disposed above the coordinated movable roller 19' between a pair of vertical supporting bars 28. The shaft of the movable roller 19' is guided in longitudinal slots 29 of the supporting bars 28 for movement parallel to the twisting axis. The pairs of supporting bars 28 are mounted in fixed relationship on a supporting plate 30. In correspondence with the radial disposition of the angle-shaped brackets 26 carrying the supply of drums 10' and the pulling sheaves 18', the supporting bars 28 carrying the rollers 19' and 20 are likewise equally distributed about the twisting axis. The strands 13, running off the respective supply drums 10', pass around the pulling sheaves 18' and thence downward into the symmetrizing mechanism where each strand first runs around the movable guide roller 19' and then around the stationary guide roller 20 and thence downwardly through a tubular bail 31 over a guide roller 32 onto the winding-up drum or cable take-up means 16'. This drum 16' is mounted for rotation within a yoke 33 which is rotatable about the twisting axis. The twisting of the strands to form the phantom cable element is effected by rotation of the frame 36 in bearings 34 and 35 whereby the bail 31 is guided around the winding drum 16'. Gears 37 and 38 interconnected by respective pinions on a shaft 39 are provided for maintaining the axis of the winding-up drum 16' stationary in space.

In Fig. 5 we have illustrated a star-quad cable forming apparatus of the vertical type in which we use a common pulling-off sheave for all of the strands, such sheave rotating about the twisting axis for provisionally pre-twisting and re-twisting the strands before they enter into the symmetrizing mechanism. The strands 13 are guided, from the supply drums 10' resting on the floor, around guiding or diverting rollers 40 and 41 to a common pulling-off sheave 22' mounted within the rotating frame 23'. The guiding or diverting rollers 40, 41 are rotatably mounted in brackets fixed to the upper supporting plate 42. By rotation of the frame 23' in bearings provided in the upper plate 42 and the lower plate 43, the strands are provisionally twisted in the entrance nipple 24' and are re-twisted in the nipple 25. In the re-twisted condition the strands pass through a symmetrizing mechanism of the same type as described with reference to Fig. 4, and thence through the bail tube 31' to the winding drum 16'.

The apparatus illustrated in Fig. 6 differs from that shown in Fig. 5 essentially in that the supply drums 10' are mounted in rotary drum carriers or yokes 11''. Another difference resides in the provision of an additional roller or sheave 22a'' within the frame 23'', the strands being guided around the pulling sheave 22'' and also around the additional sheave 22a''. The additional sheave 22a'' serves for increasing the length of frictional engagement of the strands and for compensating the weight of the pulling sheave 22''. The four strands issuing from the symmetrizing mechanism are finally twisted to a quad by rotation of the frame 44 accommodating the winding drum 16''. The yokes 11'' and the frame 44 rotate at the same speed in the same direction to thereby attain a twisting with a complete re-turning.

It is possible and often preferable to so modify the arrangement as to cause the strand yokes 11''' to revolve as in Fig. 6, while the winding drum 16' is stationary as in Fig. 4 or 5, the twisting being effected by a rotating bail.

The use of strand supply drums of stationary axis permits the use of comparatively large drums so that large lengths of strands may be twisted for the manufacture of cables of great length. Moreover, these modifications afford easy servicing and supervision.

In Figs. 7 and 8 we have shown two cable-forming apparatus for the manufacture of DM-phantom cables. In both embodiments of our invention the supply drums 10''' of one pair of drums are mounted on a common shaft and, similarly, the drums 10a''' of the other pair are mounted on a common shaft. The two drums on each shaft revolve in opposite directions to exert a mutual braking effect. The strands 13 pulled off the supply drums pass around guide rollers 45 and through a tubular bail 46 which is mounted for rotation in a bearing 47 and in a bearing 48 carried by a plate 49. The axes of rotation of the respective supply drums are stationary. Owing to the rotation of the tubular bails 46 in the same direction as indicated by the arrows, two pairs 13' and 13'' of strands are produced and are diverted by guide rollers 50 and 51 before being both engaged by a pulling sheave 22 mounted in a rotating frame 23'''. Owing to the rotation of the frame 23''' the two pairs of strands are provisionally twisted within an entrance nipple 24''' to constitute the phantom element, and are re-twisted in the exit nipple 25'''. Thence the two pairs 13' and 13'' of strands run separately through the symmetrizing mechanism comprising movable rollers 19''' and stationary rollers 20'''.

In the apparatus illustrated in Fig. 7 both pairs of strands are guided through the tubular bail 52 and over the guide roller 53 to the winding drum 16'''. The tubular bail 52, mounted in bearings 54 and 55, rotates in the direction indicated by an arrow and twists both pairs of strands together in a direction identical with that of the twist in each pair, thus forming the phantom cable element. As in this embodiment the supply drums 10''' and 10a''' and the winding drum 16''' retain their relative positions during the twisting operation, this operation being effected with re-turning.

The embodiment of our invention illustrated in Fig. 8 differs from that shown in Fig. 7 in that such re-turning does not occur. In this apparatus the strands issuing from the symmetrizing mechanism are guided by a tubular bail 56 to the winding drum 16a''' which is suitably mounted on a fixed support, stationary relative to frame 57. The bail 56 is fixed to the frame 57 mounted for rotation in bearings 58 and 59.

Our invention is capable of numerous modifications with respect to the disposition and the design of the supply drums and the winding means as well as with respect to the means for rendering the strands symmetrical. Thus, for instance, it is possible in the apparatus illustrated in Fig. 4 to mount the supply drums on the floor in a manner similar to that illustrated in Fig. 5. Moreover, it is possible in the apparatus shown in Fig. 6 to effect the twisting by means of a tubular bail similar to the apparatus shown in Figs. 4 and 5. The provisional pre-twisting effected by means of a common pulling sheave rotating about the twisting axis, and the re-twisting of the strands may be advantageously used in other cable-forming apparatus. In lieu of a common pulling sheave a caterpillar pulling device or a roller pulling device may be used. Such devices have the advantage that the strands will not change their direction within the pulling device. Moreover, a small momentum of the rotary masses will be obtained.

While the invention has been described in connection with a number of different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. A cable-forming apparatus comprising supply drums uniformly distributed about an axis for holding individual supplies of strands, a twisting station on said axis, a winding drum, feeding means for feeding individual strands from said supply drums through said twisting station to said winding drum, said feeding means including pulling sheaves uniformly distributed about said axis between said supply drums and said twisting station and individually coordinated to said supply drums, and an equalizing mechanism interposed between said pulling sheaves and said twisting station and comprising pairs of rollers uniformly distributed about said axis, each pair being mounted for cooperation with one of said strands, said mechanism further including resilient means for mounting the rollers of each pair at a variable distance depending on the tension of the associated strand.

2. A cable-forming apparatus as claimed in claim 1 in which said supply drums and said pulling sheaves are disposed substantially within a common plane.

3. A cable-forming apparatus, comprising a plurality of conductor supply means, a twisting device and a take-up winder both common to said plurality of supply means, conductor pulling means spaced from said twisting device and disposed between said twisting device and said supply means, a mechanism for rendering said conductors symmetrical with respect to tension and length thereof, said mechanism being disposed between said pulling means and said twisting device and comprising groups of loop-defining guide rollers correlated to different ones of said plurality of conductor supply means, said rollers being engageable by the conductors when in operation to pass them along said loops, the rollers at the loop exits having respective fixed axes equally spaced from said twisting device, and each of said roller groups having a yieldingly displaceable other roller for varying the loop length to thereby regulate conductor tension.

4. A cable-forming apparatus, comprising a plurality of conductor supply drums having respective fixed axes, a twisting device and a take-up winder both common to said drums, conductor pulling means spaced from said twisting device and disposed between said twisting device and said supply drums, a mechanism for rendering said conductors symmetrical with respect to tension and length thereof, said mechanism being stationarily mounted between said pulling means and said twisting device and comprising groups of loop-defining guide rollers correlated to different ones of said supply drums and engageable by the conductors when in operation to pass them along said loops, a first one of said rollers in each group having a fixed axis and defining together with said twisting device a conductor path from said loop to said twisting device, said respective first rollers being equally spaced from said twisting device and uniformly distributed about the twisting axis of said twisting device, a second one of said rollers in each group being displaceable for varying the loop length to regulate conductor tension, and spring means connected with said second rollers respectively for biasing them in the loop lengthing direction.

5. A cable-forming apparatus, comprising a plurality of supply drums for holding respective supplies of conductors, a twisting device and a wind-up drum both common to said supply drums, feed means for passing the conductors from said supply drums through said twisting device to said wind-up drum, said feed means comprising conductor pulling means spaced from said twisting device and disposed between said twisting device and said supply drums, a mechanism for rendering said conductors symmetrical with respect to tension and length thereof, said mechanism being interposed between said pulling means and said twisting device and comprising pairs of rollers correlated to different supply drums and peripherally engageable by the conductors when in operation, the rollers of each pair being spaced from each other substantially along the direction of spacing between said pulling means and said twisting device, said pairs forming respective loop paths for the conductors when engaged thereby, the rollers remote from said twisting device having respective fixed axes equally spaced from said twisting device for maintaining equal conductor lengths between said remote rollers and said twisting device, the rollers near said twisting device being yieldingly displaceable for regulating conductor tension, and said roller pairs being angularly distributed about the twisting axis of said twisting device.

6. A vertical-type cable-forming apparatus, comprising a plurality of rotatable supply means for holding respective supplies of conductors, pulling means for unwinding said supplies, a twisting device rotatably mounted beneath said pulling means and defining together therewith a substantially vertical conductor path, a cable take-up means beneath said twisting device for receiving the twisted product, a mechanism for rendering said conductors symmetrical with respect to tension and length thereof, said mechanism being interposed between said pulling means and said twisting device and comprising pairs of upper and lower rollers correlated, each pair being to different supply means and peripherally engageable by the conductors when in operation, the rollers of each pair being vertically spaced from each other, said pairs forming respective loop paths for the conductors when engaged thereby, the upper rollers of each pair having respective fixed axes equally spaced from said twisting device for maintaining equal conductor lengths between said remote rollers and said twisting device, the lower rollers of each pair being vertically displaceable for regulating conductor tension, and said roller pairs being angularly distributed about the twisting axis of said twisting device.

7. In a cable-forming apparatus according to claim 6, said mechanism comprising a number of mounting structures each having fixed bearing means for journalling one of said upper rollers and each having a vertically elongated guide extending beneath said bearing means for guiding one of said displaceable lower rollers respectively.

8. In a cable-forming apparatus according to claim 3, said pulling means comprising a plurality of pulling sheaves, one for each of said respective supply means, said sheaves and said roller groups being angularly distributed about the twisting axis of said twisting device.

9. In a cable-forming apparatus according to claim 3, said pulling means comprising a pulling sheave common to a plurality of said supply means and peripherally engageable by the conductors coming from said plurality of supply means, said sheave having a tangent substantially coincident with the twisting axis of said twisting device and defining a path for the conductors from said sheave toward said mechanism.

10. In a cable-forming apparatus according to claim 3, said supply means and said plurality of pairs of rollers being uniformly distributed about the twisting axis of said twisting device, and said pulling means being disposed to discharge the conductors substantially in the direction of said axis.

11. A cable-forming apparatus according to claim 3, comprising provisional twisting means located between said supply means and said mechanism and engageable with all conductors of said respective supply means, said twisting means having two mutually opposed directions of twist for twisting and re-twisting the conductors so that the conductors reach said mechanism in substantially non-twisted condition.

12. A cable-forming apparatus according to claim 3, comprising provisional twisting means located between said supply means and said mechanism and engageable with all conductors of said respective supply means, said twisting means having a resultant twist in a sense opposed to that of said twisting device so that the conductors reach said mechanism in substantially non-twisted condition.

13. In a cable-forming apparatus according to claim 3, said conductor supply means comprising two pairs of coaxial supply drums for simultaneously supplying two respective pairs of conductors, said pulling means comprising a single pulling sheave mounted in tangential relation to the twisting axis of said twisting device and engageable by all four conductors for jointly pulling them off said drums, a structure rotatable about said twisting axis, said sheave being revolvably mounted on said structure and having an axis of revolution transverse to said twisting axis whereby rotation of said structure imparts provisional twisting and un-twisting to said two pairs of conductors so that the conductors reach said mechanism in substantially non-twisted condition, and said mechanism having two of said roller groups engageable by said respective two pairs of conductors.

14. A cable-forming apparatus, a comprising a plurality of conductor supply means, a twisting device and a take-up winder both common to said plurality of supply means, conductor pulling means disposed between said twisting device and said supply means, and a mechanism for rendering said conductors symmetrical with respect to tension and length thereof, said mechanism being disposed between said pulling means and said twisting device and comprising groups of loop-forming guide means correlated to different conductors and engageable thereby to pass the conductors on a looped path from said pulling means to said twisting device, said guide means of each group comprising a displaceable member biased in loop lengthening sense, said respective groups being equally spaced from said twisting device and distributed about the twisting axis of said device.

15. In a cable-forming apparatus as claimed in claim 3, said pulling means comprising a single sheave mounted to engage all conductors, and means for rotating said sheave whereby said conductors are twisted, said mechanism being stationary with respect to said pulling sheave to cause untwisting of said strands on their way from said pulling sheave to said mechanism.

16. A cable-forming apparatus as claimed in claim 15, comprising rotating means connected with said take-up winder for rotating said winder to twist the conductors coming from said twisting device, and means for driving said rotating means at a speed lower than that of said means for rotating said sheave.

17. In a cable-forming apparatus as claimed in claim 3, said pulling device comprising a pair of sheaves mounted to engage all of said conductors, and means for rotating said pair of sheaves relative to said supply means and said mechanism for causing said pair of sheaves to provisionally twist the conductors, said pair of sheaves comprising a driven sheave and an idle sheave.

References Cited in the file of this patent

UNITED STATES PATENTS

| 2,022,834 | Welch et al. | Dec. 3, 1935 |
| 2,143,417 | Johannessen et al. | Jan. 10, 1939 |
| 2,506,230 | MacCreadie | May 2, 1950 |
| 2,546,977 | Clary et al. | Apr. 3, 1951 |
| 2,732,680 | Vibber | Jan. 31, 1956 |

FOREIGN PATENTS

| 241,276 | Switzerland | July 1, 1946 |
| 910,431 | Germany | May 3, 1954 |